(12) United States Patent
Speier et al.

(10) Patent No.: US 8,292,463 B2
(45) Date of Patent: Oct. 23, 2012

(54) ILLUMINATION MODULE WITH SIMILAR HEAT AND LIGHT PROPAGATION DIRECTIONS

(75) Inventors: Ingo Speier, Vancouver (CA); Damien Loveland, Richmond (CA)

(73) Assignee: Koninklijke Philips Electronics N.V., Eindhoven (NL)

( * ) Notice: Subject to any disclaimer, the term of this patent is extended or adjusted under 35 U.S.C. 154(b) by 777 days.

(21) Appl. No.: 11/829,684

(22) Filed: Jul. 27, 2007

(65) Prior Publication Data
US 2008/0170392 A1 Jul. 17, 2008

Related U.S. Application Data

(60) Provisional application No. 60/833,949, filed on Jul. 28, 2006.

(51) Int. Cl.
*F21V 29/00* (2006.01)
*B60Q 1/06* (2006.01)

(52) U.S. Cl. ......... 362/294; 362/373; 362/218; 362/800

(58) Field of Classification Search .................. 362/294, 362/373, 26–27, 218, 628
See application file for complete search history.

(56) References Cited

U.S. PATENT DOCUMENTS

| 5,852,339 | A | 12/1998 | Hamilton et al. | |
|---|---|---|---|---|
| 6,787,999 | B2 | 9/2004 | Stimac et al. | |
| 7,011,431 | B2 | 3/2006 | Ono et al. | |
| 7,048,412 | B2 | 5/2006 | Martin et al. | |
| 7,086,765 | B2 * | 8/2006 | Wehner | 362/511 |
| 7,281,823 | B2 * | 10/2007 | Moisel | 362/294 |
| 2005/0092469 | A1 * | 5/2005 | Huang | 165/126 |
| 2005/0111234 | A1 * | 5/2005 | Martin et al. | 362/555 |
| 2005/0169006 | A1 | 8/2005 | Wang et al. | |
| 2005/0258438 | A1 | 11/2005 | Arik et al. | |
| 2006/0092639 | A1 | 5/2006 | Livesay et al. | |
| 2006/0139945 | A1 | 6/2006 | Negley et al. | |
| 2006/0196651 | A1 | 9/2006 | Board et al. | |

FOREIGN PATENT DOCUMENTS

| CA | 2490590 A1 | 12/2005 |
|---|---|---|
| GB | 2389706 | 12/2003 |
| WO | 2006049844 A2 | 5/2006 |

* cited by examiner

*Primary Examiner* — Diane Lee
*Assistant Examiner* — Sean Gramling
(74) *Attorney, Agent, or Firm* — John F. Salazar; Mark L. Beloborodov

(57) ABSTRACT

The present invention provides an illumination module comprising one or more light-emitting elements which are thermally coupled to one or more heat extraction elements. The one or more heat extraction elements are configured to transfer heat in substantially a first direction. One or more optical elements are further integrated into the illumination module, wherein the one or more optical elements are optically coupled to the one or more light-emitting elements and configured to redirect the light emitted by the one or more light-emitting elements in substantially the first direction.

18 Claims, 15 Drawing Sheets

ILLUMINATION MODULE WITH SIMILAR HEAT AND LIGHT PROPAGATION DIRECTIONS

FIELD OF THE INVENTION

The present invention pertains to thermal management and beam shaping of illumination devices, and more particularly to an illumination device having a heat extraction element for thermal management of one or more light sources.

BACKGROUND

High brightness illumination modules are used in a number of lighting applications, such as ambient lighting, accent lighting, wall washing, signage, advertising, decorative and display lighting, facade lighting, custom lighting and the like. These illumination modules typically include a plurality of light sources, such as incandescent bulbs, fluorescent tubes, neon, or solid-state light-emitting diodes (LEDs), coupled to a power management system to supply and control the intensity of the light sources depending on the brightness requirements of the lighting application.

While in operation, most high brightness illumination modules generate excess amounts of thermal energy. In the case of incandescent bulbs, the thermal energy is used to heat the filament to high temperatures in order to produce light. However, for solid-state luminaries having LEDs, the thermal energy from the LEDs is transferred to the substrate, causing an increase in temperature and the LEDs to function less optimally resulting in a reduction in the luminous flux of the output light. As a result, more drive current is required to maintain the output light of the LEDs at the required level. However, increases in the drive current causes a further temperature increase in the substrate, thereby compounding the negative impact of the thermal energy on the performance of the solid-state illumination module.

Another aspect of solid-state luminaries is the need for a relatively large optic in order to provide as much mixing as possible of the different wavelengths emitted from separate light-emitting diodes within the luminaire. Another potential benefit of a large optic is the greater effectiveness of collimation of the output beam. Often the size and positioning of the thermal management system in a luminaire restricts the space available for beam shaping optics, which can reduce the quality of coloured light mixing and beam collimation.

It is therefore desirable to develop a thermal management system to overcome the undesirable effect of excess heat on the performance of solid-state illumination modules, without unduly compromising the performance of the optical system. An example of such a thermal management system is a heat pipe. A heat pipe is a thermally conductive pipe which contains a small quantity of working fluid such as water therein. Generally, one end of the heat pipe is positioned proximate to the heat source to maintain thermal contact with the heat source, for example an LED. As the temperature of the heat source increases, the thermal energy generated by the heat source causes the liquid inside the heat pipe to vaporize. As a result, heat from the heat source is absorbed by the vaporizing liquid, thereby removing heat from the heat source. The vaporized liquid travels away from the heat source, through the pipe, to the cool end of the pipe, typically referred to as the condenser end. At the condenser end of the heat pipe, the vapor condenses to its original liquid form and the heat dissipation cycle is completed. Typically, the condensing end of the heat pipe is thermally connected to a heat sink for improved heat dissipation.

A number of heat pipe thermal management systems have been proposed. United States Patent Application Publication No. 2006/0092639 to Livesay et al. describes a light source having multiple heat pipes arranged to form a light recycling cavity. Light from arrays of LEDs mounted on the heat pipes is captured and reflected from the light recycling cavity. In this set-up, the heat travels away from the source either perpendicularly to the light emitted by the source, or in the opposite direction to that of the light emitted by the source, wherein both of these configurations can result in a bulky arrangement.

United States Patent Application Publication No. 2005/0092469 to Huang teaches a loop heat pipe for cooling an LED illumination apparatus. The evaporator end of the loop heat pipe is in thermal communication with the LEDs, and the condenser end of the heat pipe is associated with a cover of the illumination apparatus. A drawback associated with the loop heat pipe of Huang is that the cover becomes bulky and has to adopt the shape of the loop heat pipe. Use of such a loop heat pipe may require a complicated arrangement which may restrict the design of the illumination apparatus and may increase costs.

United States Patent Application Publication No. 2005/0169006 to Wang et al. describes an LED lamp having a heat sink with a reflector, an LED module, and a generally U-shaped heat pipe thermally coupled at one end to the LED module and to the heat sink at the other end. In this LED lamp, the heat pipe is generally positioned opposite to the light emitting side of the light source, which may result in an elongated configuration of the LED lamp.

U.S. Pat. No. 5,852,339 to Hamilton et al. teaches a heat sink for dissipating the heat from the driver circuitry of an electrodeless bulb assembly. The heat sink of Hamilton et al, includes a number of heat pipes arranged longitudinally along the length of the heat sink. The heat sink disclosed by Hamilton et al, is designed to direct the heat away from the drive circuitry rather than the electrodeless bulb.

United States Patent Application Publication No. 2005/0258438 to Arik et al, discloses a lighting apparatus having LED chips mounted on a chip support wall that is coupled to a concave sealed volume. This sealed volume includes a heat transfer fluid and defines a passive heat pipe for cooling the LED chips. To operate effectively, the sealed volume is configured such that it is a certain minimum size. As a result, this arrangement for a lighting apparatus may not be practical due to the requirement of a larger volume as more LED chips are being used, which can result in a bulky lighting apparatus.

United States Patent Application Publication No. 2006/0196651 to Board et al, discloses an optoelectronic device which includes a light emitting semiconductor device coupled to a transparent or translucent heat pipe. The light emitted by the light emitting semiconductor device is transmitted through and along the length of the heat pipe. For this configuration of an optoelectronic device, as the heat pipe is also used for light transmission the optical efficiency of this device will be hindered the phase changes of the working fluid in addition to the multiple interfaces through which the light must pass and thus the heat pipe provides both heat transfer and light transmission. This configuration of an optoelectronic device would therefore result in a diminished luminous flux output therefrom. In addition the versatility of design of an optoelectronic device of this configuration is limited by the required configuration of the heat pipe.

U.S. Pat. No. 7,011,431 to Ono et al, provides a lighting apparatus having a light-emitting unit and a heat dissipation unit, whereby heat is transferred from the light-emitting unit to the heat dissipation unit using a heat pipe. Accordingly, the heat pipe as disclosed by Ono et al, serves only as a conduit for transfer of thermal energy, and a heat dissipation unit is still required to dissipate heat from the lighting apparatus. In addition, the lighting apparatus as proposed by Ono et al. can be complex and can include a plurality of mechanical parts, which can again lead to a bulky lighting apparatus.

U.S. Pat. No. 7,048,412 to Martin et al, teaches a lamp post with an axial heat pipe coupled to a lateral heat pipe to transfer heat away from the LED sources. The lamp post includes post facets where the LED sources are mounted. A segmented reflector is provided for guiding light from the LED sources. An axial heat pipe coupled to a lateral heat pipe is provided to transfer heat for dissipation. The lamp post as defined by Martin et al, is configured such that light and heat travel in opposite directions thereby resulting in an inefficient use of space.

Therefore there is a need for a new illumination module that can provide for adequate thermal management of light sources and light extraction from the light sources, while enabling a reduction in the overall size of the illumination module.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide an illumination module with similar heat and light propagation directions. In accordance with one aspect of the present invention, there is provided an illumination module comprising: one or more arrays of one or more light-emitting elements for generating light; one or more heat extraction elements in thermal communication with one or more arrays, said one or more heat extraction elements transferring heat in substantially a first direction; and an optical system optically coupled to the array, the optical system configured to direct the light from the light-emitting elements substantially in the first direction.

DETAILED DESCRIPTION OF THE INVENTION

Definitions

Figure 1:
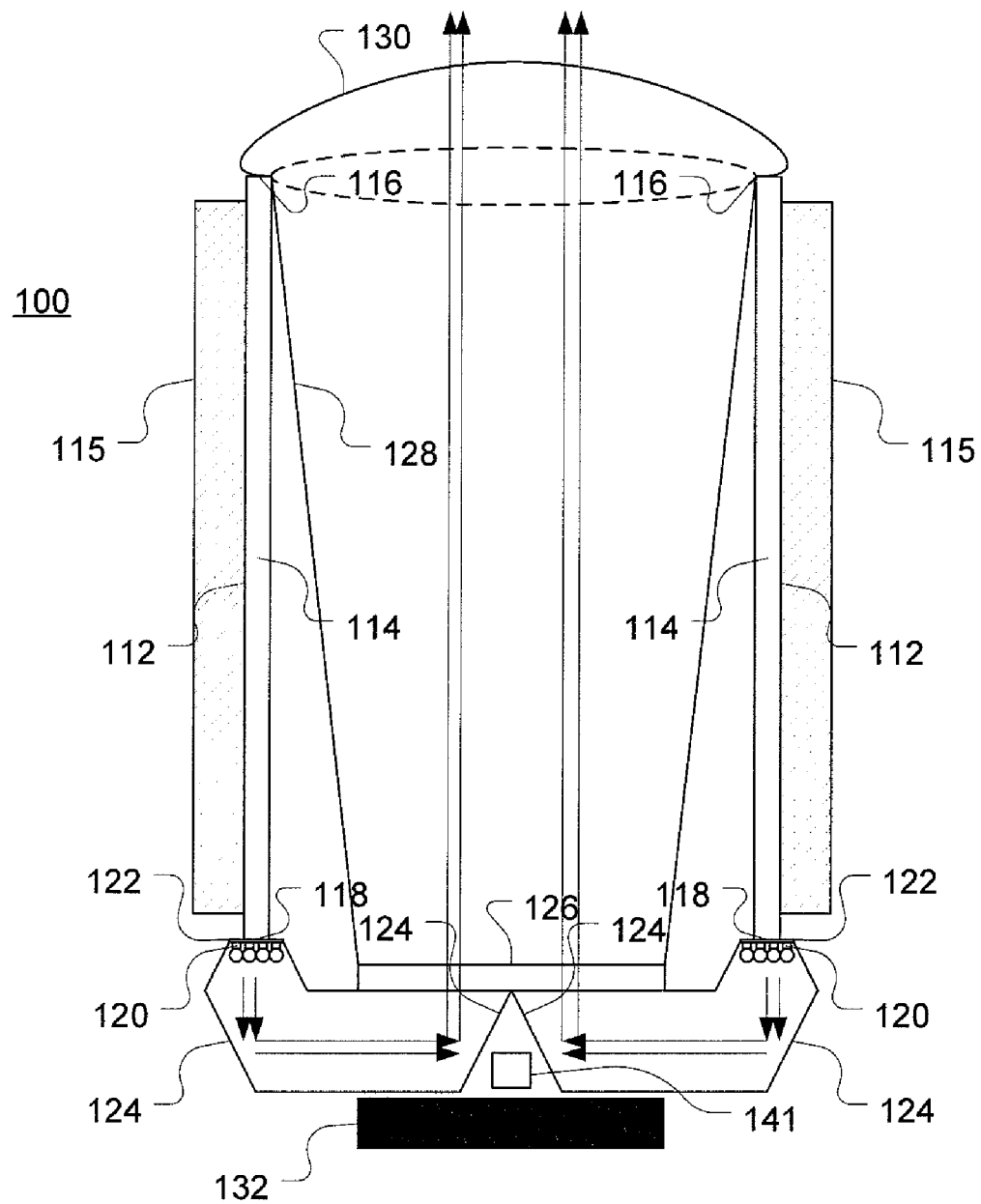
FIG. 1 is a cross sectional view of an illumination module according to one embodiment of the present invention.

The term "light-emitting element" (LEE) is used to define a device that emits radiation in a region or combination of regions of the electromagnetic spectrum for example, the visible region, infrared and/or ultraviolet region, when activated by applying a potential difference across it or passing a current through it, for example. Therefore a light-emitting element can have monochromatic, quasi-monochromatic, polychromatic or broadband spectral emission characteristics. Examples of light-emitting elements include semiconductor, organic, or polymer/polymeric light-emitting diodes, blue or UV pumped phosphor coated light-emitting diodes, optically pumped nanocrystal light-emitting diodes or other similar devices as would be readily understood by a worker skilled in the art. Furthermore, the term light-emitting element is used to define the specific device that emits the radiation, for example a LED die, and can equally be used to define a combination of the specific device that emits the radiation together with a housing or package within which the specific device or devices are placed.

The term "light-emitting diode" (LED) is used to define a lighting device such as a resonant cavity LED (RCLED), superluminescent LED (SLLED), organic LED (OLED), flexible OLED (FOLED), Flip Chip LED (FCLED), or vertical cavity surface emitting laser (VCSEL), high-brightness LED or other lighting device as would be readily understood by a worker skilled in the art.

The term "optical sensor" is used to define an optical device having a measurable sensor parameter in response to a characteristic of incident light, such as luminous or radiant flux output.

The term "optical element" is used to define an optical device configured to manipulate the characteristics of electromagnetic radiation, for example light. Examples of an optical element include but are not limited to an optical lens, reflector, refractive element, diffractive element, diffusive element, holographic element or other optically active component as would be readily understood by a worker skilled in the art.

The term "output light" is used to define electromagnetic radiation of a particular frequency or range of frequencies in a region of the electromagnetic spectrum for example, the visible, infrared and ultraviolet regions, or a combination of regions of the electromagnetic spectrum, wherein the output light is generated by one or more light-emitting elements.

As used herein, the term "about" refers to a +/−10% variation from the nominal value. It is to be understood that such a variation is always included in any given value provided herein, whether or not it is specifically referred to.

Unless defined otherwise, all technical and scientific terms used herein have the same meaning as commonly understood by one of ordinary skill in the art to which this invention belongs.

The present invention arises from the realization that light from conventional illumination modules having heat pipes exits the illumination module in a direction different from the direction by which the heat pipe transfers heat from the light sources of the illumination module. Since the heat pipe must be over a minimum length to provide sufficient heat extraction from the light sources, conventional illumination modules must therefore comport with the design limitations of the heat pipe. In addition, since the optics must be over a minimum length to provide sufficient light mixing and beam collimation from the light sources, conventional illumination modules therefore comport with the design limitations of the optics. As a result, conventional illumination modules cannot be fabricated as compact as possible due to design restrictions imposed by the minimum length of the heat pipe, while providing a desired level of light mixing and collimation and heat extraction. The present invention seeks to alleviate these drawbacks by providing an illumination module having a plurality of light-emitting elements in thermal communication with a heat extraction element, wherein the illumination module is configured such that the direction of light output and the direction of thermal transfer, which are provided by the illumination module, are substantially in the same direction.

The illumination module according to the present invention comprises one or more light-emitting elements which are thermally coupled to one or more heat extraction elements. The one or more heat extraction elements being configured to transfer heat in substantially a first direction. An optical system is further integrated into the illumination module, wherein the optical system is optically coupled to the one or more light emitting elements and configured to redirect the light emitted by the one or more light-emitting elements in substantially the first direction. Wherein the one or more heat extraction elements and the optical system are configured in order that the illumination module can operate within desired operational parameters.

FIG. 1 illustrates an illumination module according to one embodiment of the present invention. The illumination module 100 comprises one or more heat pipes 112, with one or more light-emitting elements 120 thermally coupled to the evaporator end 118 of the heat pipe 112. During operation, the one or more light-emitting elements 120 produce heat which is transferred by the heat pipe 112 from the evaporator end 118 to the condenser, the condenser comprising the remainder of the heat pipe and the opposite end 116, thereof. Thermally connected to the heat pipe 112 is a heat sink 115, which can provide for the transfer of heat from the heat pipe 112 to the environment enabling heat dissipation, wherein the transfer of heat by the heat pipe 112 is provided in a substantially a first direction. The illumination further comprises an optical system configured to manipulate the light emitted by the one or more light-emitting elements and direct this light in substantially the first direction, thereby resulting in heat transfer and light propagation in substantially the same direction. As illustrated in FIG. 1, the optical system comprises optical reflectors 124 positioned such that output light from the light-emitting elements 120 is reflected against the inner walls of the optical reflectors 124 and directed outside of the optical cavity of the illumination module 100. The optical reflectors 124 may be hollow as illustrated, or may be a solid transparent light guide, wherein the reflection occurs due to total internal reflection. In addition, when the optical reflectors are hollow, they may be partially or fully filled with encapsulant, and may optionally comprise one or more recesses for the accommodation of the one or more light-emitting elements.

Further, as illustrated in FIG. 1, the optical system may also include an optical element 128 having a light exit aperture at the top portion of the illumination module, wherein the optical element can provide light mixing and collimation, if required. The illumination module thereby enables the transfer of heat and the propagation of light in substantially the same direction, over a majority of the length of the luminaire, while being capable of achieving desired operational parameters, for example achieving a desired luminous flux output and generating light having a desired chromaticity.

Heat Extraction Element

The illumination module comprises one or more heat extraction elements which are in thermal communication with the one or more light-emitting elements and configured to transfer heat away from the one or more light-emitting elements. Heat extraction elements can be a heat pipe, thermosyphon, or other passive or active heat extraction element which can transfer heat from one location to another.

For example, a heat pipe is a device that can quickly transfer heat from one point to another. A typical heat pipe is formed from a sealed hollow tube, which is typically manufactured from a thermally conductive material, for example aluminium or copper. A heat pipe contains a working fluid therein and an internal wick structure which provides a means for liquid phase working fluid to return to the evaporator end of the heat pipe. In particular, the wick allows the capillary driving force to return the condensate formed at the condenser end of the heat pipe to the evaporator end thereof. The quality and type of wick usually determines the orientation dependent performance of the heat pipe. Different types of wicks are used depending on the application for which the heat pipe is being used including sintered, grooved, mesh type structures or the like. Working fluids can range from liquid helium for extremely low temperature applications to mercury for high temperature conditions. The working fluid may also be for example water or ammonia or other format of working fluid as would be readily understood by a worker skilled in the art.

FIG. 1 illustrates an illumination module in accordance with one embodiment of the present invention. The illumination module 100 has a plurality of heat pipes 112, each having a condenser comprising the majority of the intermediate bulk portion 114 adjacent to a condenser end 116, each having an evaporator end 118 at an opposite end of the heat pipe. The bulk portion 114 of each heat pipe is a substantially tubular hollow body that comprises a quantity of phase changing medium or working fluid, such as ammonia or water. As heat in the region of the evaporator end 118 intensifies, the phase changing medium proximate to the evaporator end 118 vaporizes and migrates towards the condenser end 116. The vapors are condensed along the intermediate bulk portion 114 and/or at the condenser end 116. Excess heat from the condenser end 116 is dissipated from the condenser end 116 for example directly into the ambient surroundings via thermal convection, conduction and radiation.

In one embodiment of the present invention the one or more heat extraction elements are thermally coupled to a heat sink or other heat dissipation mechanism, such as a forced air device. The heat sink can be configured as a separate component and subsequently thermally coupled to a heat extraction element or the heat sink may be integrally formed with the heat extraction element.

For example, as illustrated in FIG. 1, the bulk portion 114 of each heat pipe 112 is coupled to a heat sink 115 to dissipate heat from the heat pipe and further improve the condensing of the vaporized phase changing medium. The heat sink 115 can be a cast structure with holes into which the heat pipes 112 are inserted. Although the heat sinks 115 of the present invention are fin-shaped, it can be appreciated by those skilled in the art that other shapes or configurations of heat sinks can instead or also be employed to accelerate the condensation of the vaporized liquid contained in the bulk portion 114, thereby enabling the dissipation of heat from the illumination module.

In one embodiment of the present invention, the one or more heat extraction elements are thermally connected to an active cooling device, which can provide for heat removal from the illumination module. The active cooling devices can be configured as heat exchangers, chillers, fans or other active cooling devices as would be readily understood by a worker skilled in the art.

In one embodiment of the present invention the heat extraction element comprises traces or electrical circuitry to provide pathways for providing electrical power or control signals to the one or more light-emitting elements. For example, the heat extraction element can be surface patterned with electrically conductive traces. The heat extraction element can have layers of dielectric material attached to it which can be used to isolate electrical traces, for example.

In one embodiment of the present invention, the heat extraction element is used as a thermally conductive and electrically passive element.

In one embodiment, the heat extraction element is made from a thermally and electrically conducting material, such as aluminum, silver, copper or the like. The heat extraction element may be used to provide electricity or act as an electrical contact for anodes or cathodes of the one or more light-emitting elements. Accordingly, an electrically active heat extraction element can provide an electrically conductive path for supply of electrical power or control signals to the one or more light-emitting elements.

Light-Emitting Elements

The illumination module includes one or more light-emitting elements which are thermally coupled to the one or more heat extraction elements. The one or more light-emitting elements may emit electromagnetic radiation which has monochromatic, quasi-monochromatic, polychromatic or broadband spectral emission characteristics. In one embodiment of the present invention, a plurality of light-emitting elements can be configured into arrays whereby an array emits light of substantially a single colour or substantially a blend of colours.

In one embodiment, the light-emitting elements are selected such that white light can be generated. For example the illumination module can comprise one or more white light-emitting elements or can comprise a plurality of light-emitting elements which emit light in the red, green and blue wavelength ranges, wherein the blending thereof can produce white light. In one embodiment, further colours of light-emitting elements can be integrated into the illumination module, for example amber, cyan or the like, wherein the selection of the format of a light-emitting element can be determined based on the desired chromaticity of the produced light.

In one embodiment of the present invention, the light-emitting elements or arrays thereof may be removable and replaceable. The light-emitting elements may be a monolithic die with an array of LEDs, or a plurality of individual LEDs. In one embodiment of the present invention, the light-emitting elements may be configured as a quad pack of LED chips in a package which further comprises a primary optic.

In one embodiment of the present invention, the one or more light-emitting elements are mounted on a substrate, which is thermally conductive, which is thermally coupled to the one or more heat extraction elements. For example, as illustrated in FIG. 1, the substrate 122 is in thermal contact with the evaporator end 118 of the heat pipe 112 so as to transfer excess heat from the exothermic light-emitting elements 120 to the heat pipe 112 for dissipation. The intermediate bulk portion 114, condenser end 116 and evaporator end 118 together form a thermally conductive path for transporting the heat away from the light-emitting elements 120 in thermal communication with the evaporator end 118.

In one embodiment of the present invention, in order to improve the heat transfer from the light-emitting elements to the heat extraction element, the substrate is chosen from a material with high heat conductivity properties, such as for example, ceramic, AlN, $Al_2O_3$, BeO, metal core printed circuit board (MCPCB), direct bond copper (DBC), CVD diamond or other suitable thermally conductive material as would be known to a worker skilled in the art. In one embodiment the substrate can be fabricated from a metal, for example Olin 194, Cu, CuW or other thermally conductive metal or alloy. In one embodiment, the substrate may be coated with a dielectric material for electrical isolation of one or more light-emitting elements, and/or electrical contacts. In one embodiment, electrical traces can be deposited onto dielectric coated substrate to allow electrical connectivity.

In one embodiment of the present invention, the substrate includes a number of socket formations wherein each socket formation is adapted to receive a light-emitting element therein. The socket formations may be shaped so as to correspond to the geometric contours of the one or more light-emitting elements. Such socket formations can envelop the light-emitting elements, thereby substantially maximizing the contact surface between the one or more light-emitting elements and the substrate. Where LEDs are used as the light-emitting elements, the LEDs may be bonded by a solder, adhesive, thermal epoxy such as indium or tin, lead/tin, gold/tin or the like to the corresponding socket formations, or electrolithically deposited in the socket formations, wherein the bonding material can be selected to provide a desired level of thermal conductivity.

In one embodiment of the present invention, in order to further enhance the transfer of heat from the one or more light-emitting elements to the evaporator end a heat pipe, the light-emitting elements can be positioned as close as possible to the evaporator end to substantially maximize heat transfer to the heat pipe.

In one embodiment of the present invention, the one or more light-emitting elements are bonded directly to the heat extraction element, without an intermediate substrate, wherein the heat extraction element can provide electrical connectivity to the one or more light-emitting elements.

In one embodiment of the present invention, a plurality of step-like wells are formed on the substrate in between the one or more light-emitting elements operatively coupled thereto. The step-like wells can be configured to reflect light emitted from the sidewalls of a light-emitting element away from an adjacent light-emitting element. In this manner, more of the light emitted by the light-emitting elements can be directed out of the illumination module.

In one embodiment of the present invention, an anti-reflection coating may be deposited on the emitting surface of the one or more light-emitting elements by ion beam sputtering or other techniques as would be known to a worker skilled in the art. In one embodiment a surface patterning may be applied to one or more of the light-emitting surfaces of the light-emitting elements.

Optical System

The illumination module further comprises an optical system which is configured to redirect the light emitted by the one or more light-emitting elements, in a direction which is substantially the same as the direction of heat transfer by the one or more heat extraction elements. For example, inside the envelope defined by the illumination module, and for a majority of the length of the illumination module, heat and light both travel in substantially the same direction. The output light from the light-emitting elements is redirected out of the illumination module by way of the optical system which can include one or more optical elements, which are configured to provide one or more of extraction, collection, blending and redirection of the output light.

The optical system can be designed to minimize the number of times light is reflected when transmitted through this optical system and still provide mixing or randomization of light to provide homogeneous chromaticity and luminance.

In one embodiment of the present invention, the optical system comprises one or more of the following optical components. A first optical component is an optical element for redirecting and mixing the light emitted from the light emitting elements, a second optical component is an optical element for shaping and mixing the light and a third optical component is an optical output element for shaping and mixing the light.

In embodiments of the present invention, the optical system comprises one or more reflective or refractive optical elements, for example, solid or hollow light pipes or light guides for the transmission of light. The optical elements can have predetermined axial or perpendicular cross sections.

In embodiments of the present invention, the optical system comprises one or more refractive elements, for example, one or more lenses, Fresnel lenses, lens arrays, tandem lens arrays, diffractive and holographic elements.

In embodiment of the present invention, the optical system comprises diffuser elements or fluid lenses with variable focal lengths to control beam distribution and collimation.

In one embodiment the optical system comprises a hollow or solid light pipe. It is understood, that the cross sectional shape of, for example, an axially symmetric light pipe can determine the collimation properties of a beam. For example, the length and flare angle of a light pipe can optimize the efficiency of the luminaire. Generally, the shape of the reflective wall, for example, its axial profile for an axial symmetric reflective wall, can determine the effectiveness of the optical system. For example, the profile can be characterized by its entrance aperture size, exit aperture size, length, and curvature. In embodiments of the present invention, the curvature of the profile can be parabolic, elliptic, or hyperbolic. Alternatively, the profile or the optically active surface can comprise individual straight or curved continuous conical segments.

Various cross sectional shapes of optical systems according to embodiments of the present invention are possible, including circular, triangular, square, hexagonal, and other polygonal cross section perpendicular to the overall light propagation of an optical system, for example, a light-pipe or light-guide.

In embodiments of the present invention, the optical system comprises a reflective wall surface of predetermined perpendicular and axial cross sectional profile that extends between an entrance aperture and an exit aperture. The wall surface can assist with beam shaping and colour mixing. It is understood, that the cross section of the surface can have an axial symmetric shape or it can have any other desired shape. The surface can flare or taper towards the exit aperture. For example, axially symmetrical systems with square, hexagonal or octagonal perpendicular cross sections can more effectively mix and randomize light than circular or triangular wall structures. Consequently, this form of secondary optical system can provide better randomization and can have more compact dimensions.

In one embodiment, the optical system can comprise a refractive element, for example, a dome lens, a Fresnel lens, or a micro lens array proximal to the output aperture. This element can be an integral part of one of the aforementioned light pipe or light guides, for example. It is understood, that the optical system can also comprise a diffractive, a holographic, a reflective, or a diffusive element proximal to the exit aperture. Furthermore, any refractive element can also be a controllable variable focal length fluid lens.

For example, as illustrated in FIG. 1, the optical system comprises one or more optical elements configured as optical reflectors 124 positioned such that output light from the light-emitting elements 120 is reflected against the inner walls of the optical reflectors 124 and directed outside of the optical cavity of the illumination module 100. The optical reflectors 124 may be mirrors relatively positioned to direct the output light from the light-emitting elements 120 in the desired direction. The optical reflectors may have plane, curved or faceted surfaces or a combination thereof. The optical reflectors 124 may be hollow or solid. For example when the optical reflectors are configured to be solid, total internal reflection typically occurs.

In one embodiment of the present invention, and as illustrated in FIG. 1, the optical system comprises an optical diffuser 126 provided along the path of the output light, wherein this optical diffuser may be positioned at any position along the optical path of the output light within the luminaire. The optical diffuser 126 can serve to further mix the light from the light-emitting elements and can be fabricated from ground glass, translucent plastic, a holographic diffuser or other type of diffuser as would be known to a worker skilled in the art.

In one embodiment of the present invention, the optical system can comprise one or more optical elements configured to collimate and/or mix the light emitted by the one or more light-emitting elements. For example as illustrated in FIG. 1, the optical system includes an optical element 128 in the form of a tapered light pipe, having a light exit aperture at the top portion, and a smaller, light entrance aperture at the bottom portion. The optical element 128 further includes an inner reflecting sidewall portion. In one embodiment, the optical element can be a polymer and reflectively coated, or fabricated from a thermally conductive material such as thermoplastic polymer, aluminum, cast aluminum, copper, silver, magnesium, or a combination thereof, which is reflectively coated, wherein this format of optical element can enhance heat transfer to the one or more heat extraction elements.

In one embodiment of the present invention, an optical element of the optical system of the illumination module can be a Totally Internally Reflecting Concentrator (TIRC) or a frustoconic Dielectric Totally Internally Reflecting Concentrator (DTIRC). In one embodiment of the present invention, the optical element may be a reflector such as a Compound Parabolic Concentrator (CPC), an Elliptical Concentrator (EC), a Compound Elliptical Concentrator (CEC), a Totally Internally Reflecting Reflector, Color-mixing Totally Internally Reflecting Reflector, a Compound Hyperbolic Concentrator (CHQ) or other optical element as would be readily understood by a worker skilled in the art. Furthermore, an optical element can be a shaped solid or hollow element. Irrespective of the optical element employed, the optical element may include flat or curved exit apertures.

In one embodiment, the inner surfaces of the sidewall portion of an optical element may be coated with a metalized highly reflective coating such as silver, protected silver, aluminum, enhanced aluminum, dielectric or Zeonex E48R manufactured by Zeon Chemicals, USA so as to reflect the output light that is directed onto the sidewall portion towards the exit aperture. This type of optical element can be manufactured from low-melting glass or plastics using injection-molding techniques, or other similar methods known to those skilled in the art.

In one embodiment, an optical element like that defined as optical element 128 in FIG. 1, may be manufactured as a two-piece surface reflector using an injection-molded polymer which is subsequently coated with a reflecting metal or dielectric coating stack, or a combination thereof.

In one embodiment one embodiment of the present invention, and with further reference to FIG. 1, for optical element 128 of the optical system used in the illumination module, the inner surface sidewall portion thereof and the surface of the centre portion, for example as identified as 124, when the elements are hollow, are characterized by having a smooth surface that is substantially free of discontinuities, pits, jagged points, or other surface defects. Accordingly, the surface can be coated with a metalized reflective coating, which can provide for enhanced reflectivity of the optical element and the centre portion. When the elements 124 and 128 are solid, reflection occurs via total internal reflection and coating is typically not necessary.

In one embodiment, the inner reflective surfaces of elements 124, the section depicted as an inverted V, may be partially transmissive in order to allow some of the light emitted from the light-emitting elements to leak through to an optical sensor 141. The optical sensor can provide feedback information relating to chromaticity or luminous flux output to a control system. For example, the sensor, or sensors, can be a photo-sensor, photo-diode or other optically sensitive sensor as would be known by a worker skilled in the art.

In one embodiment, for example as illustrated in FIG. 1, the optical system further comprises an optical lens 130 positioned proximate to the exit aperture of optical element 128. The optical lens 130 can provide further beam shaping of the output light from the light-emitting elements 120. In one embodiment of the present invention, the optical system further comprises a diffuser.

In one embodiment of the present invention, the optical system comprises components which include wavelength converters, for example phosphors or other components as would be known to a worker skilled in the art. Depending on the configuration of these wavelength converters, they may be coated on the surface of an optical element, or impregnated within the optical element or both.

The illumination module is coupled to an electronic power management system for controlling the operation of the one or more light-emitting elements and can optionally be removably and replaceably located beneath the optical reflectors. The electronic power management system can optionally include one or more sensors to monitor operational characteristics of the illumination module. For example the illumination module can comprise one or more optical sensors configured to collect information indicative of the characteristics of the output light, for example, the luminous flux output and/or chromaticity of the output light. The illumination module may comprise one or more temperature sensors configured to collection information indicative of the operational temperature of the one or more light-emitting elements. The illumination module may comprise one or more voltage sensors, current sensor or other sensor configured to collection other information indicative of the operational characteristics of the illumination module, as would be readily understood by a worker skilled in the art. The information indicative of operational characteristics of the illumination module which is collected by the one or more sensors can be used to determine control parameters for the one or more light-emitting elements, in order that a desired operation of the illumination module can be attained, for example luminous flux output and output light chromaticity.

In one embodiment of the present invention, the electronic power management system 132 is directly coupled to the illumination module as illustrated in FIG. 1. In one embodiment is coupled to the illumination module via a socket connection.

In one embodiment of the present invention, the electronic power management system can be coupled to the illumination module via a cabling or wiring system.

The invention will now be described with reference to further specific examples. It will be understood that the following examples are intended to describe embodiments of the invention and are not intended to limit the invention in any way.

EXAMPLES

Example 1

Figure 2A:
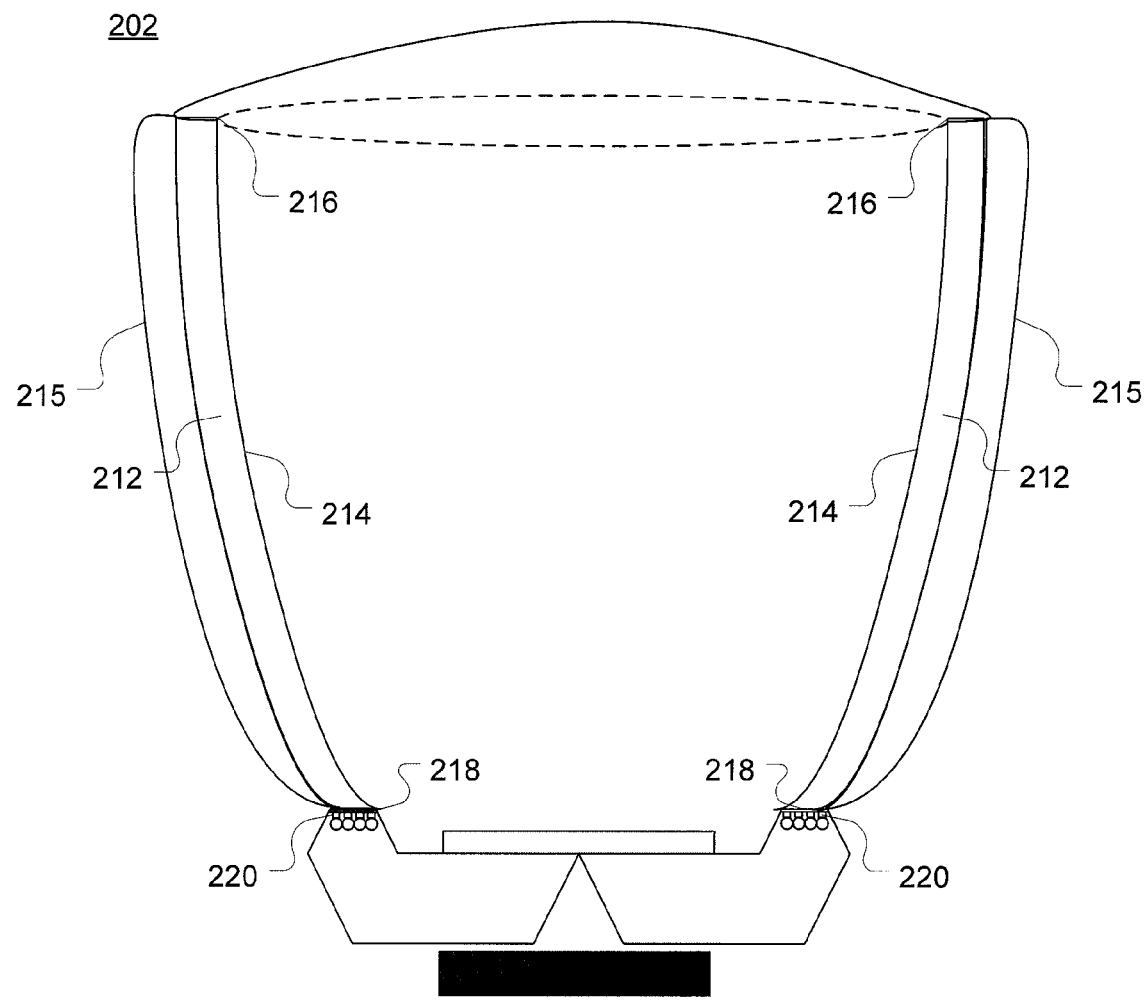
FIG. 2(a) is a cross sectional view of an illumination module according to one embodiment of the present invention.

Referring now to FIG. 2(a) which illustrates an illumination module according to one embodiment of the present invention. The illumination module 202 includes heat pipes 212 for cooling a plurality of light-emitting elements 220. The heat pipes 212 each include an intermediate bulk portion 214, a condenser region at one end 216 of the bulk portion 214 including an adjacent portion thereof and a evaporator region 218 at an opposite end of the bulk portion 214. The bulk portions 214 of the heat pipes 212 have reflective sidewall portions. The reflective sidewall portions of the bulk portions 214 also have parabolic cross-sections so as to form an optical element for beam shaping of the output light from the light-emitting elements 220. It can be appreciated by those skilled in the art that the shape of the sidewall portions of the bulk portions may be concave, elliptical, circular, or other shapes depending on the beam shaping requirements of the illumination module 200.

Figure 2B:
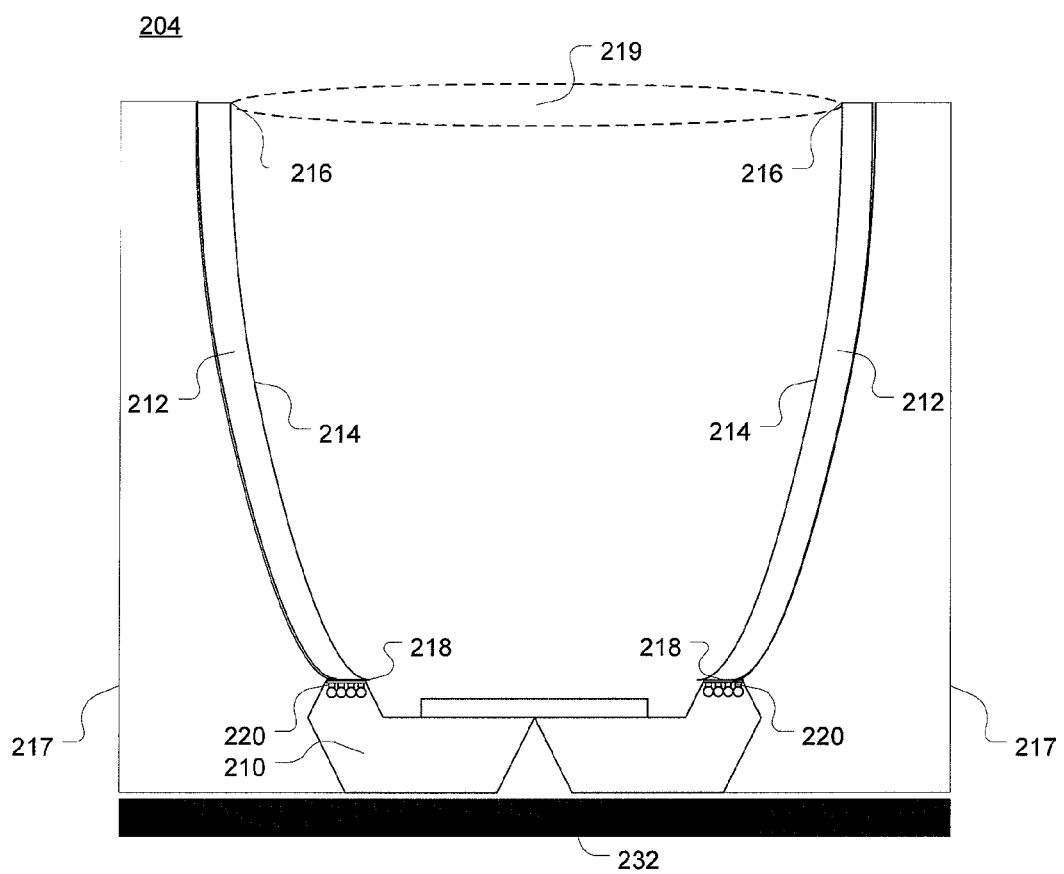
FIG. 2(b) is a cross sectional view of an illumination module similar to that of FIG. 2(a) according to one embodiment of the present invention.

The heat pipes optionally include active or passive heat sinks 215. The heat sinks 215 may be shaped to follow the contours of the sidewall portions of the bulk portions 214, as illustrated in FIG. 2(a). In one embodiment, the heat sink 215 can be a cast structure with slots into which the heat pipes 212 are positioned. In one embodiment as shown in FIG. 2(b), the illumination module 204 includes heat sinks 215 that form a housing enclosure for the illumination module 204. The housing may be hexagonal, octagonal, tapered, paraboloid, faceted, compound or other shapes considered by skilled artisans. As shown in FIG. 2(b), the power management system 232 is located removably and replaceably below the housing for ease of maintenance or replacement. Optionally, a window 219 can be provided to protect the internal components of the illumination module 204. Inside the envelope defined by the illumination module, and for the majority of the length of the illumination module, heat and light from the light-emitting elements both travel in substantially the same direction. Furthermore, light redirection elements 210 may be configured as hollow elements or solid elements.

Example 2

Figure 3A:
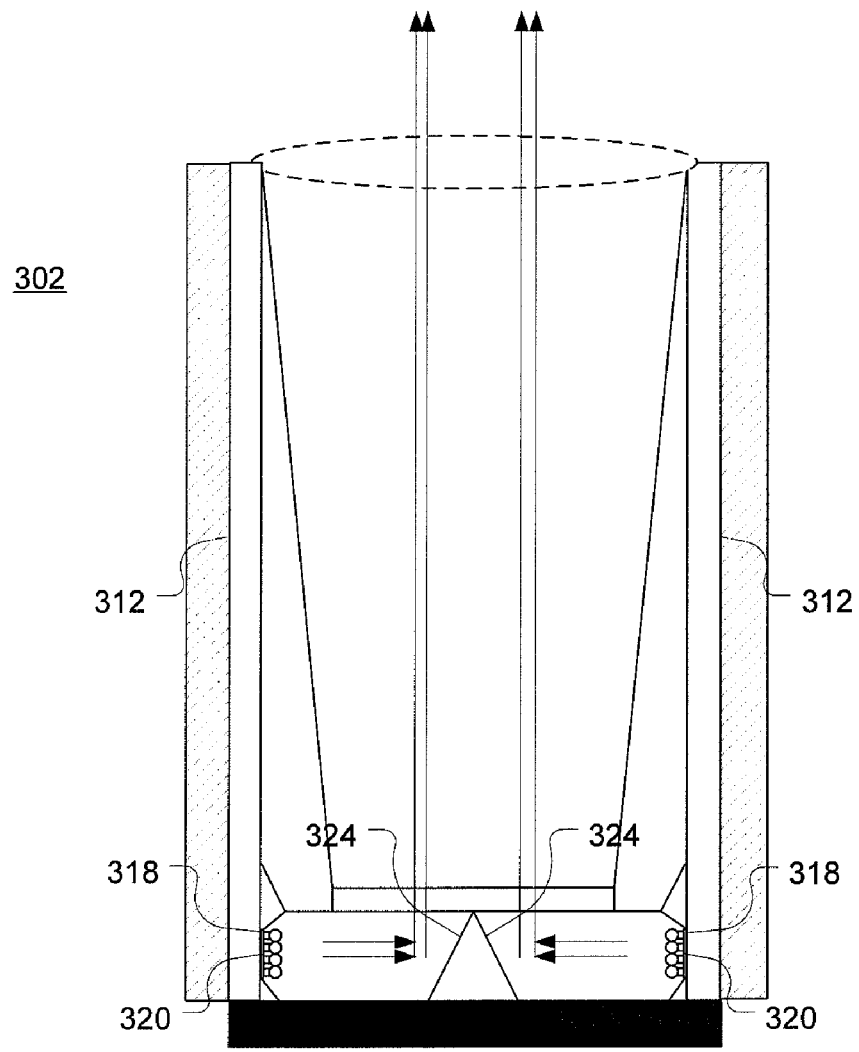
FIG. 3(a) is a cross sectional view of an illumination module according to one embodiment of the present invention.

FIG. 3(a) illustrates an illumination module 302 according to one embodiment of the present invention. The illumination module 302 includes a plurality of heat pipes 312 having contact surfaces 318 in thermal communication with corresponding side-mounted light-emitting elements 320. A possible benefit of side mounting the light-emitting elements is that fewer reflections are needed for light extraction. Optical reflectors 324 or light guides are positioned along the path of the output light from the light-emitting elements 320 so as to bend the output light emanating from the light-emitting elements 320 in a direction along a longitudinal axis of the illumination module 302. Inside the envelope defined by the illumination module, and for the majority of the length of the illumination module, heat and light from the light-emitting elements both travel in substantially the same direction.

Figure 3B:
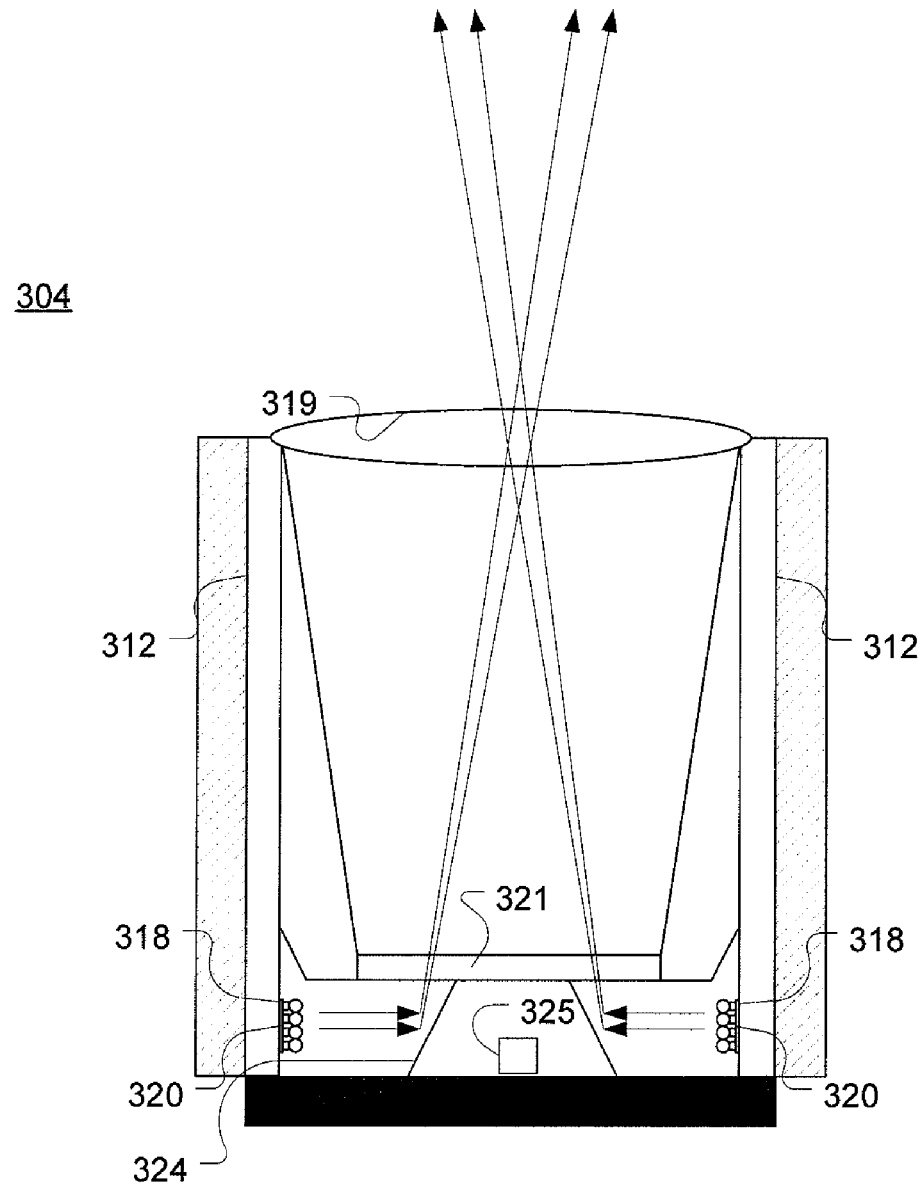
FIG. 3(b) is a cross sectional view of an illumination module similar to that of FIG. 3(a) according to one embodiment of the present invention.

FIG. 3(b) illustrates one embodiment of the present invention similar to that illustrated in FIG. 3(b), whereby the illumination module 304 further includes a condenser lens 319 located at a focal distance from the diffuser 321. The condenser lens 319 is located at the output aperture of the illumination module 304 and collimates the output light. The diffuser 321 may comprise more than one type of optical element. In one embodiment, a diffuser is placed proximate to reflective surface 324, on surface 324, on lens 319 or other location along the optical path. Inside the envelope defined by the illumination module, and for the majority of the length of the illumination module, heat and light from the light-emitting elements both travel in substantially the same direction.

Example 3

Figure 4:
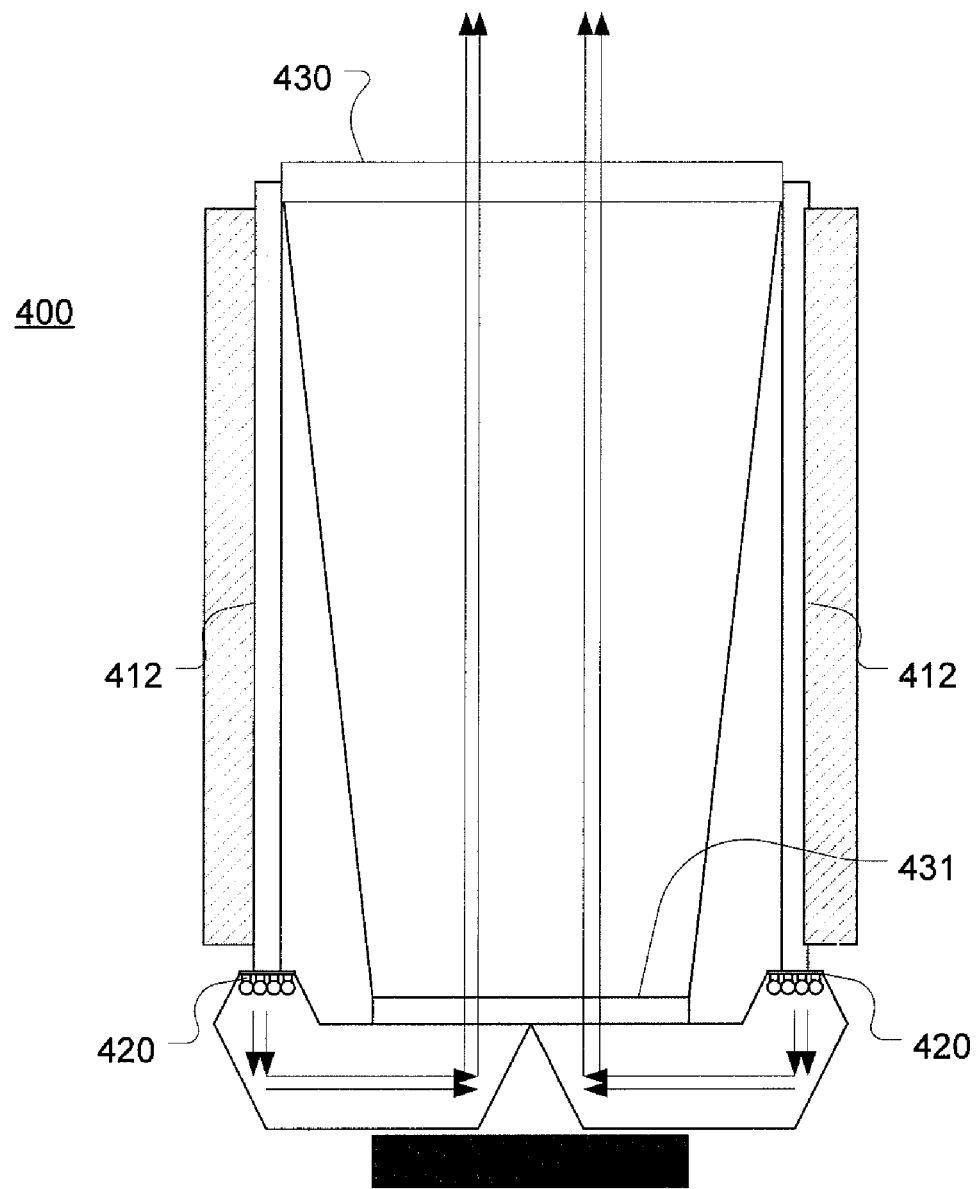
FIG. 4 is a cross sectional view of an illumination module according to one embodiment of the present invention.

One embodiment of the present invention is shown in FIG. 4. Illumination module 400 includes heat pipes 412 and a plurality of light-emitting elements 420 grouped into arrays. Each array of light-emitting elements 420 is attached to the evaporator end of each heat pipe 412 and is thermally connected to the respective heat pipe 412 for transfer of heat from the light-emitting elements 420 to the heat pipes 412. The illumination module 400 also includes a tandem lens array 430 and 431 located at the entrance and aperture ends of the illumination module 400 to manipulate the optical characteristics of the output light.

Example 4

Figure 5:
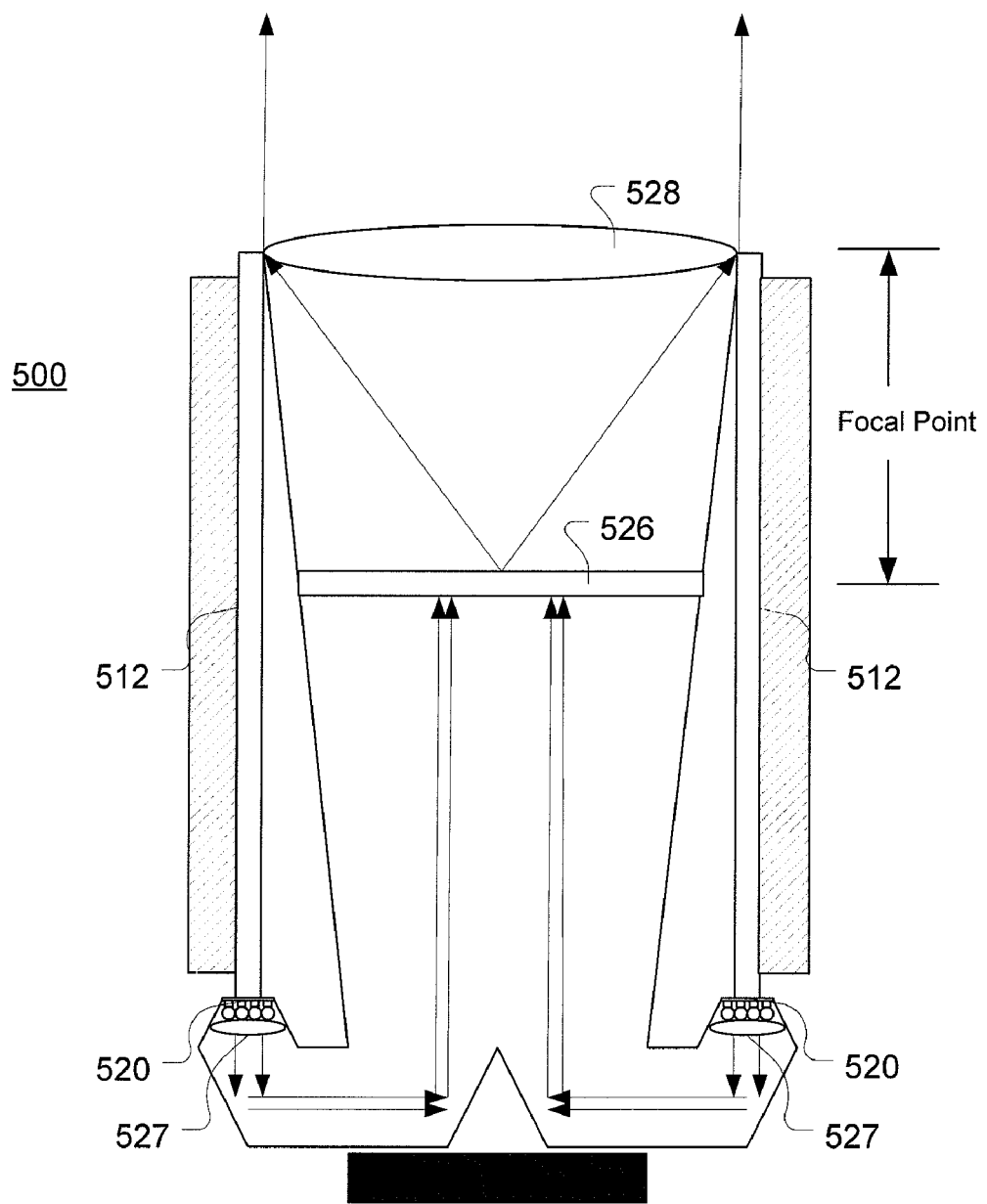
FIG. 5 is a cross sectional view of an illumination module according to one embodiment of the present invention.

One embodiment of the present invention is illustrated in FIG. 5. There is shown in FIG. 5 an illumination module 500 having a plurality of light-emitting elements 520 thermally coupled to the evaporator ends of heat pipes 512 for cooling of the light-emitting elements 520 during operation. The lenses 527 can create overlapping images of all the light-emitting elements in the plane of the optical diffuser 526. The lens 528 is positioned in the exit plane of the illumination module at a focal distance from the plane of the diffuser 526, imaging the plane of the diffuser 526 at substantially infinity. A diffuser can also be placed adjacent to the lens 528 or in any other plane in the illumination module. Inside the envelope defined by the illumination module, and for the majority of the length of the illumination module, heat and light from the light-emitting elements both travel in substantially the same direction.

Example 5

Figure 6:
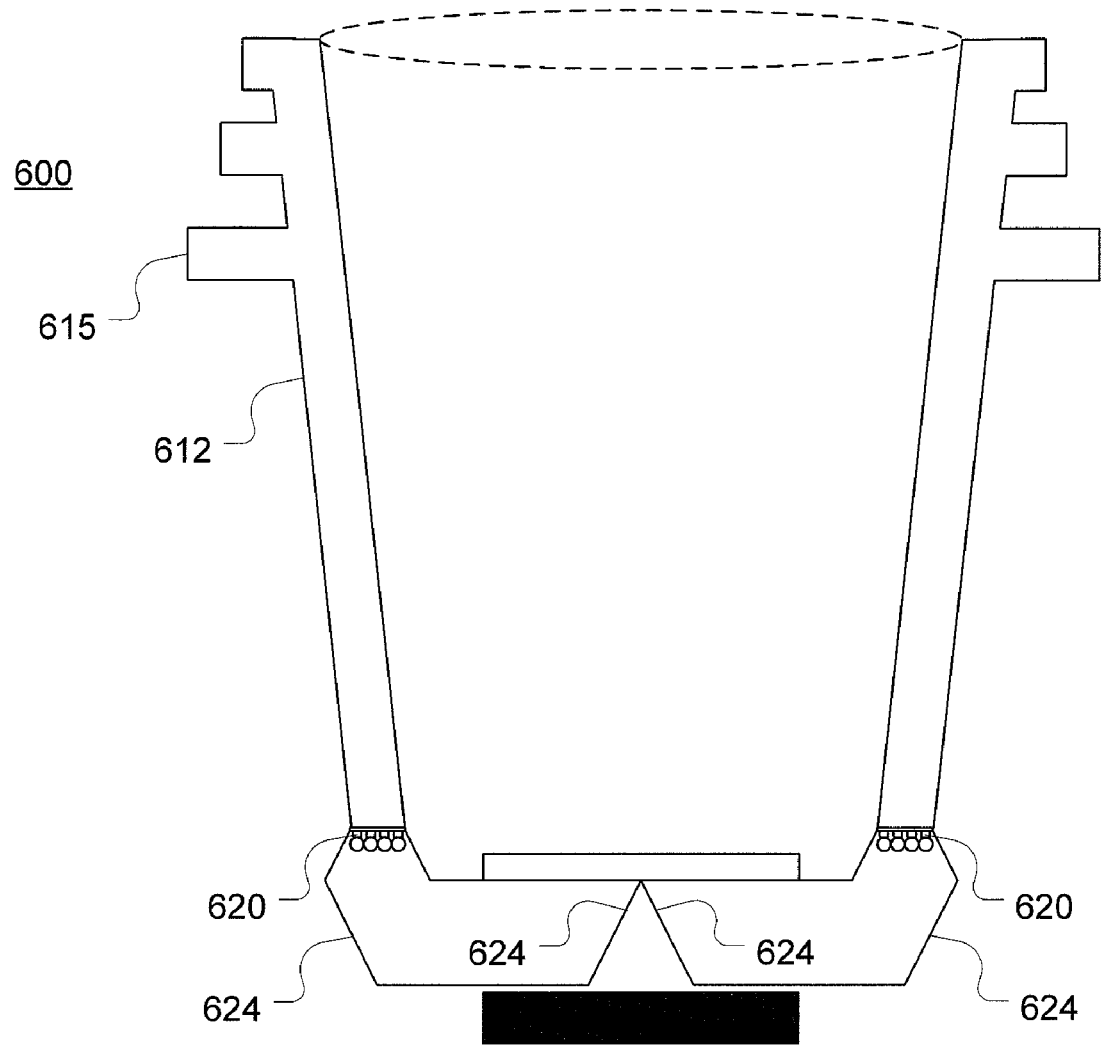
FIG. 6 is a cross sectional view of an illumination module according to one embodiment of the present invention.

According to one embodiment of the present invention, and with reference to FIG. 6, the illumination module 600 comprises a frustoconical unitary heat pipe 612. The illumination module 600 further includes a plurality of light-emitting elements 620 that are in thermal communication with the heat pipe 612 for heat extraction and dissipation. Optical reflectors or light guide 624 positioned along the path of the output light from the light-emitting elements 620 direct the output light along a path that is generally parallel to a longitudinal axis of the illumination module 600 towards an exit aperture thereof. The heat pipe 612 also includes a heat sink structure 615 that is integral to the heat pipe 612 for enhanced cooling operation of the heat pipe 612. Inside the envelope defined by the illumination module, and for the majority of the length of the illumination module, heat and light from the light-emitting elements both travel in substantially the same direction. In one embodiment of the present invention, the inner surface is designed to achieve optical effects such as collimation and/or light mixing.

Example 6

Figure 7:
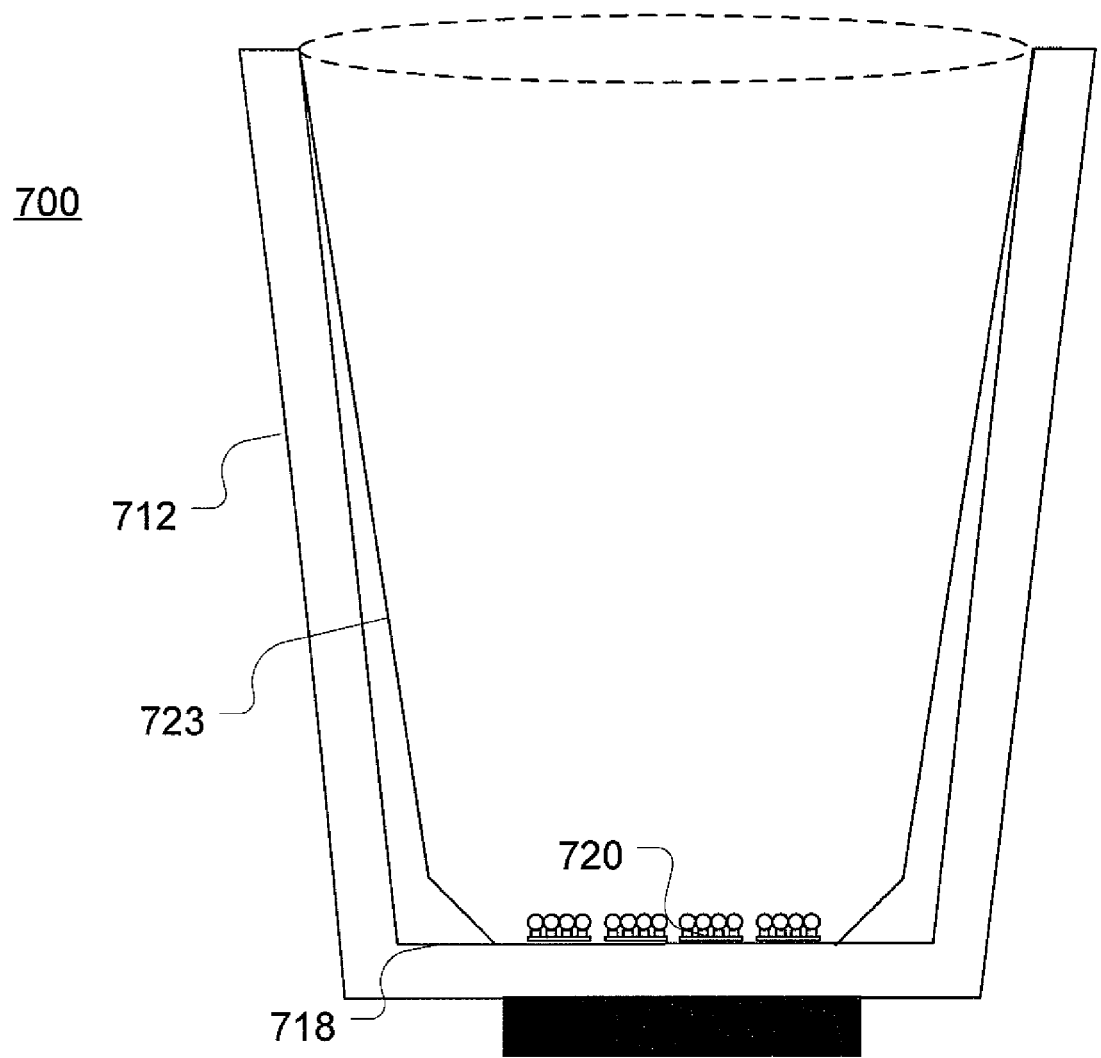
FIG. 7 is a cross sectional view of an illumination module according to one embodiment of the present invention.

There is shown in FIG. 7 one embodiment of the present invention, wherein an illumination module 700 has a U-shaped heat pipe 712 in a housing (not illustrated) and a plurality of light-emitting elements 720 in thermal connection with a central contact surface 718 of the heat pipe 712. Heat from the light-emitting elements 720 is absorbed by the heat pipe 712 and transferred towards two or more condenser ends.

In one embodiment, the heat pipe may be coated with optically reflective material such as aluminum, silver or dielectric, or can be lined with a reflector material 723 for example 3M Vikuity ESR foil. Inside the envelope defined by the illumination module, and for the majority of the length of the illumination module, heat and light from the light-emitting elements both travel in substantially the same direction.

Example 7

Figure 8:
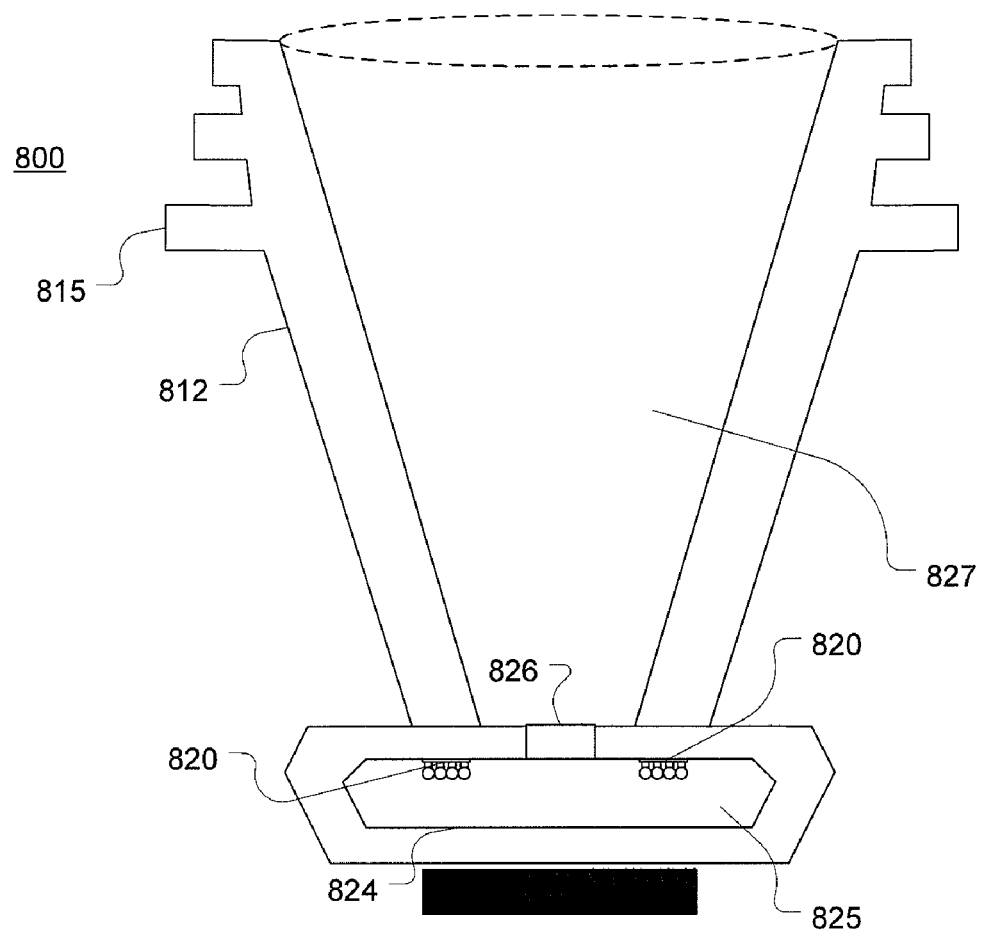
FIG. 8 is a cross sectional view of an illumination module according to one embodiment of the present invention.

FIG. 8 illustrates one embodiment of the present invention. FIG. 8 shows an illumination module 800 having a heat pipe 812 thermally coupled to a plurality of light-emitting elements 820 for cooling. Light emitted by the light-emitting elements undergoes repeated reflections in the lower cavity 825 of the illumination module, and as a result is effectively mixed before passing through aperture 826 to the upper cavity 827 of the illumination module. In one embodiment of the present invention, the aperture 826 can extend to cover the entire entrance aperture area of the upper cavity 827. Inside the envelope defined by the illumination module, and for the majority of the length of the illumination module, heat and light from the light-emitting elements both travel in substantially the same direction.

Example 8

Figure 9:
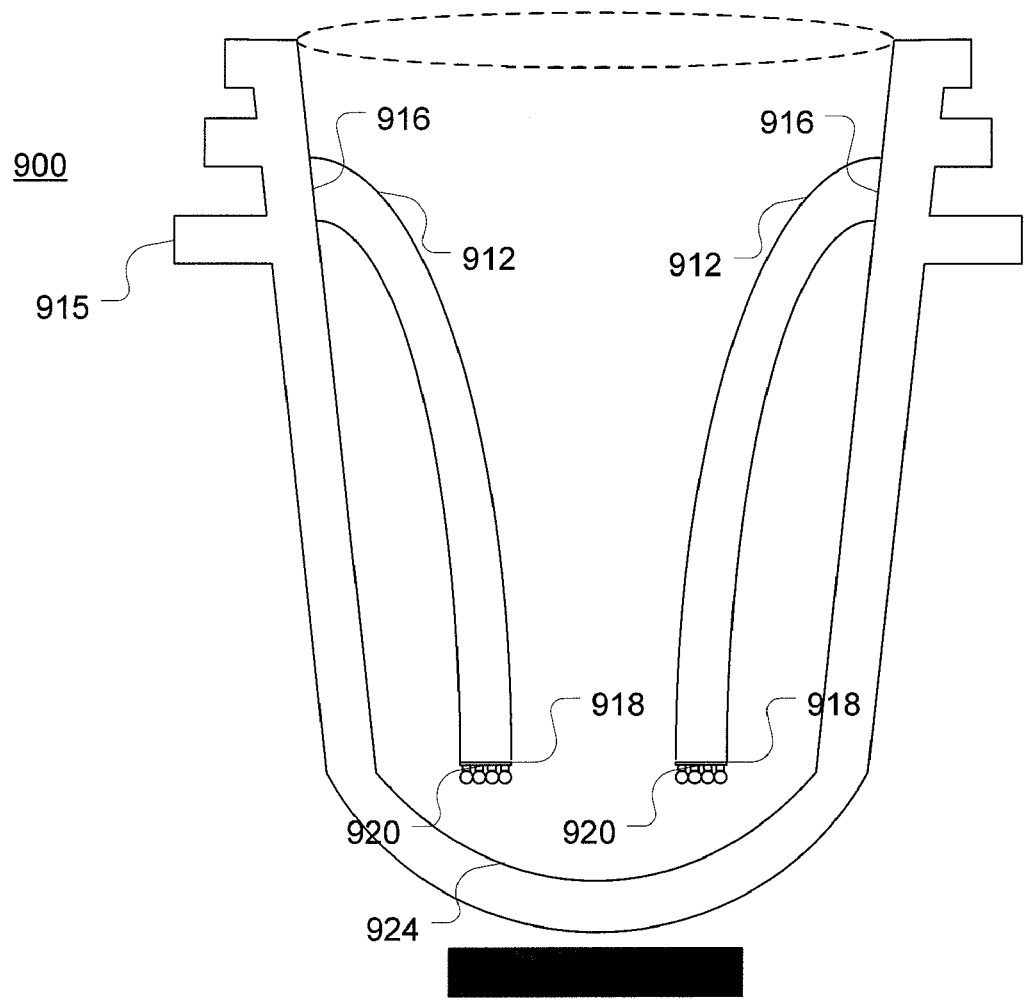
FIG. 9 is a cross sectional view of an illumination module according to one embodiment of the present invention.

Reference is now made to FIG. 9, which shows an illumination module 900 according to one embodiment of the present invention. The illumination module 900 includes a generally cup-shaped heat sink 915 having a reflective surface 924. There is also provided heat pipes 912 each having a condenser end 916 thermally coupled to the heat sink 915, as well as a evaporator end 918 in thermal communication with a plurality of light-emitting elements 920. Heat from the light-emitting elements 920 is absorbed by the phase change medium inside the heat pipes 912 and transferred to the heat sink 915 for dissipation. In one embodiment of the present invention, FIG. 9 can represent a cross sectional view of a linear illumination module of generally a longitudinally extended U-shape. Inside the envelope defined by the illumination module, and for the majority of the length of the illumination module, heat and light from the light-emitting elements both travel in substantially the same direction.

Example 9

Figure 10:
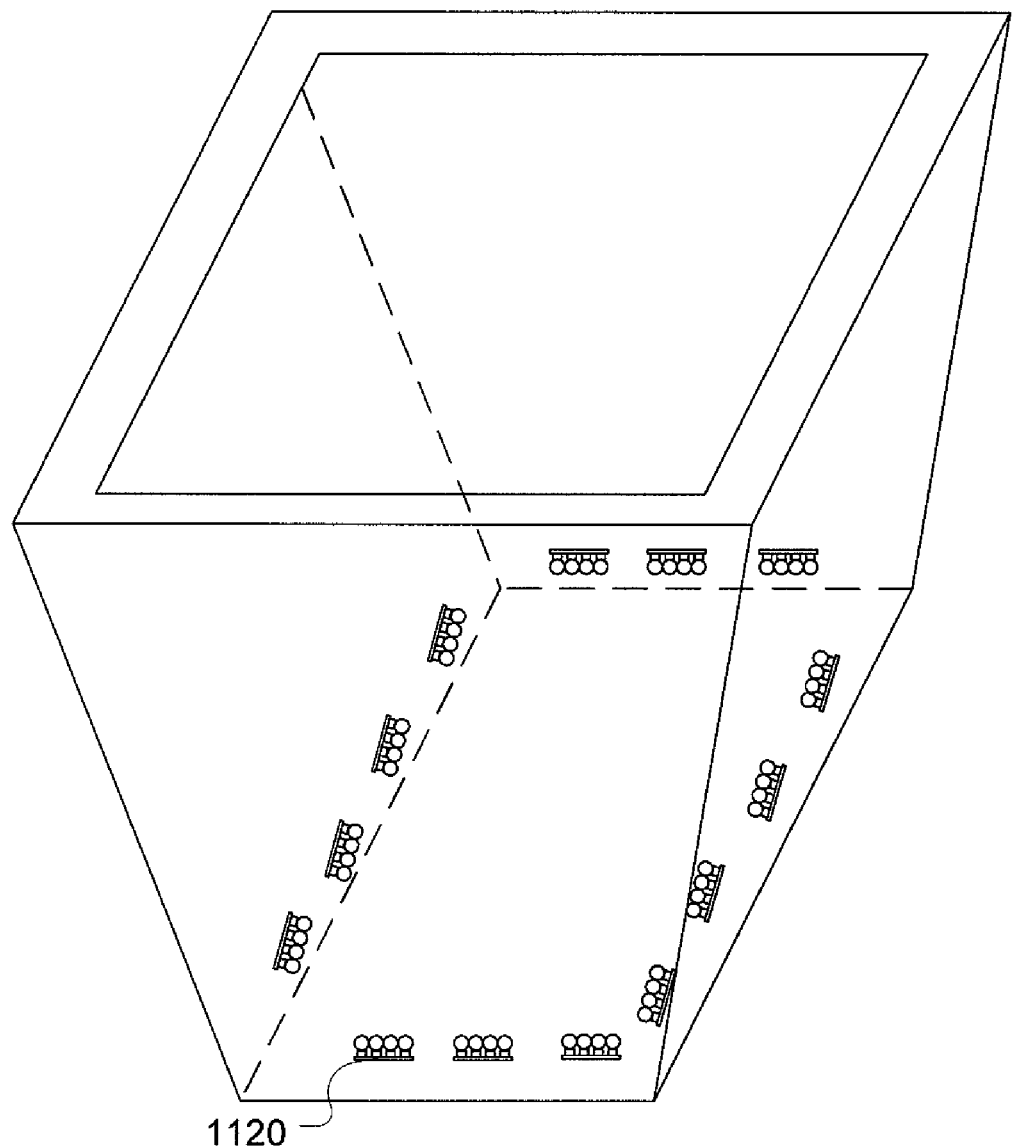
FIG. 10 is a perspective view of an illumination module comprising heat pipes which are configured to additionally act as reflectors, according to one embodiment of the present invention.
Figure 11:
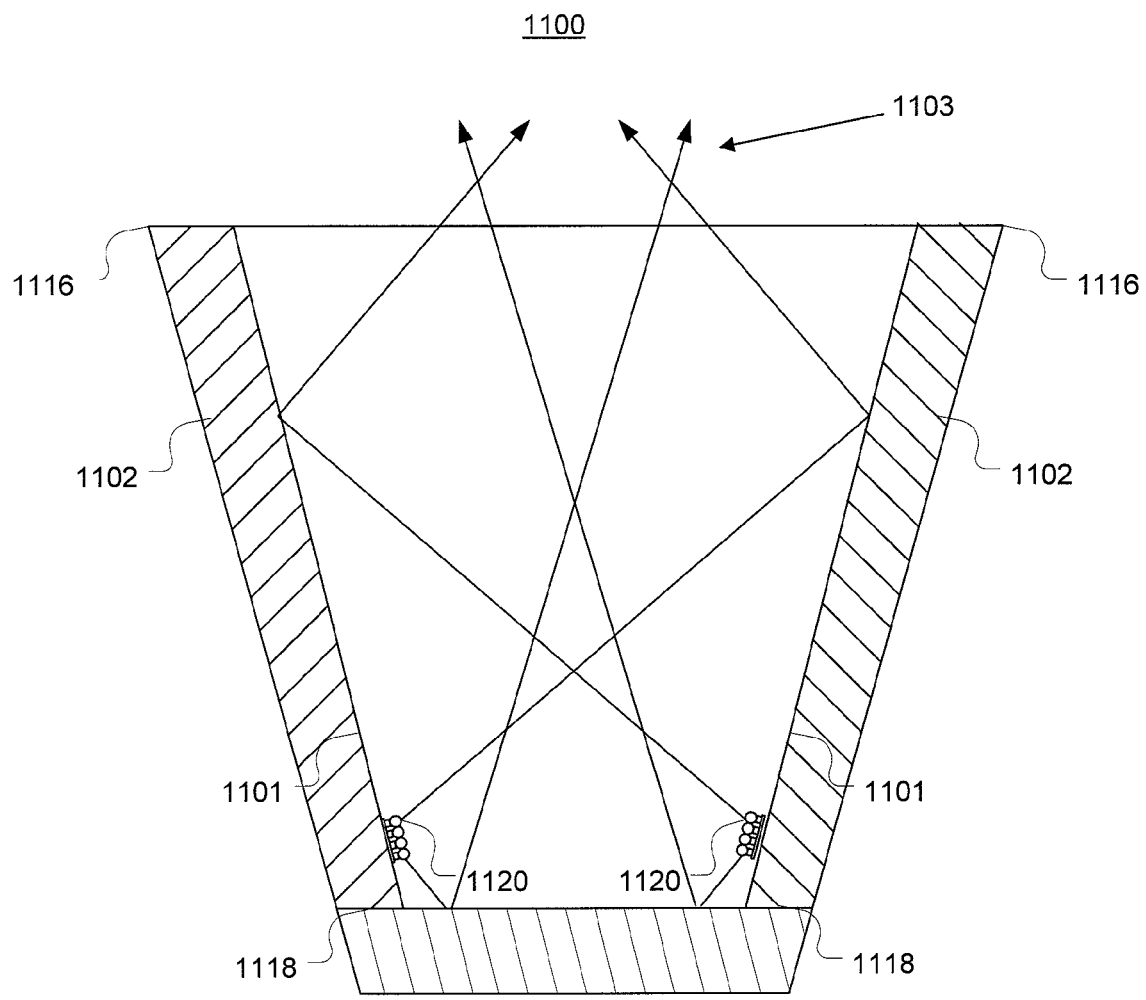
FIG. 11 is a cross sectional view of FIG. 10 according to one embodiment of the present invention.

FIG. 10 and FIG. 11 show an illumination module 1100 comprising four planar heat pipes 1120 forming the side walls of the illumination module according to one embodiment of the present invention. FIG. 11 is a cross sectional view of FIG. 10. The inner surfaces 1101 of the heat pipes are reflective, reflectively coated or lined with a reflective foil. Light-emitting elements are positioned on the reflective surfaces at the lower, inner end of the illumination module. Light emitted from the light-emitting elements undergoes repeated reflection from the inner surfaces of the illumination module before exiting the illumination module as mixed light 1103. Heat from the light-emitting elements travels from the vicinity of the evaporator ends 1118 of the heat pipes 1102, through the heat pipes towards the condenser ends 1116 of the heat pipes located at the exit end of the illumination module. Inside the envelope defined by the illumination module, and for the majority of the length of the illumination module, heat and light from the light-emitting elements both travel in substantially the same direction.

Figure 12:
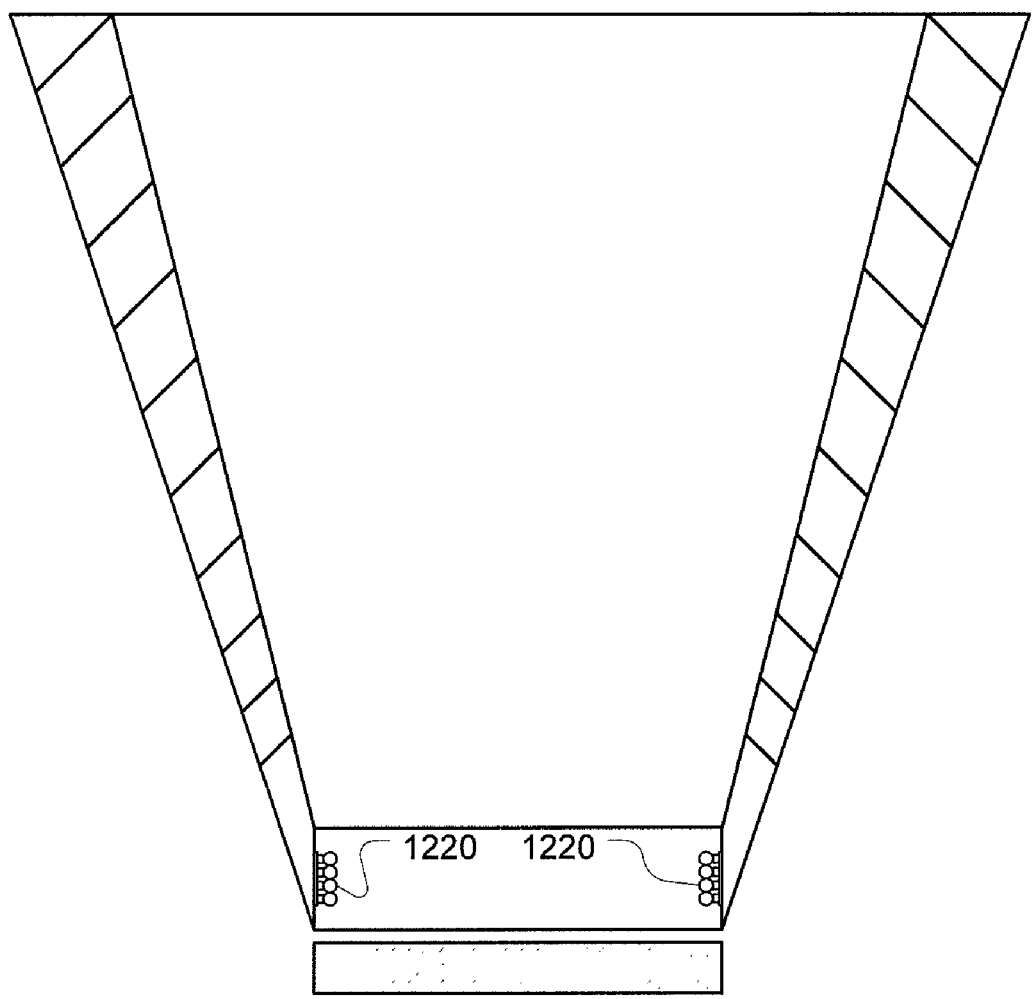
FIG. 12 is a cross sectional view of FIG. 10, according to one embodiment of the present invention.

FIG. 12 is an illumination module 1200 which is similar in many respects to that of FIG. 11, the main difference being that the light-emitting elements 1220 are thermally connected to a surface which is different to that of the main inner reflective surface of the illumination module 1200. Inside the envelope defined by the illumination module 1200, and for the majority of the length of the illumination module, heat and light from the light-emitting elements 1220 both travel in substantially the same direction.

Example 10

Figure 13:
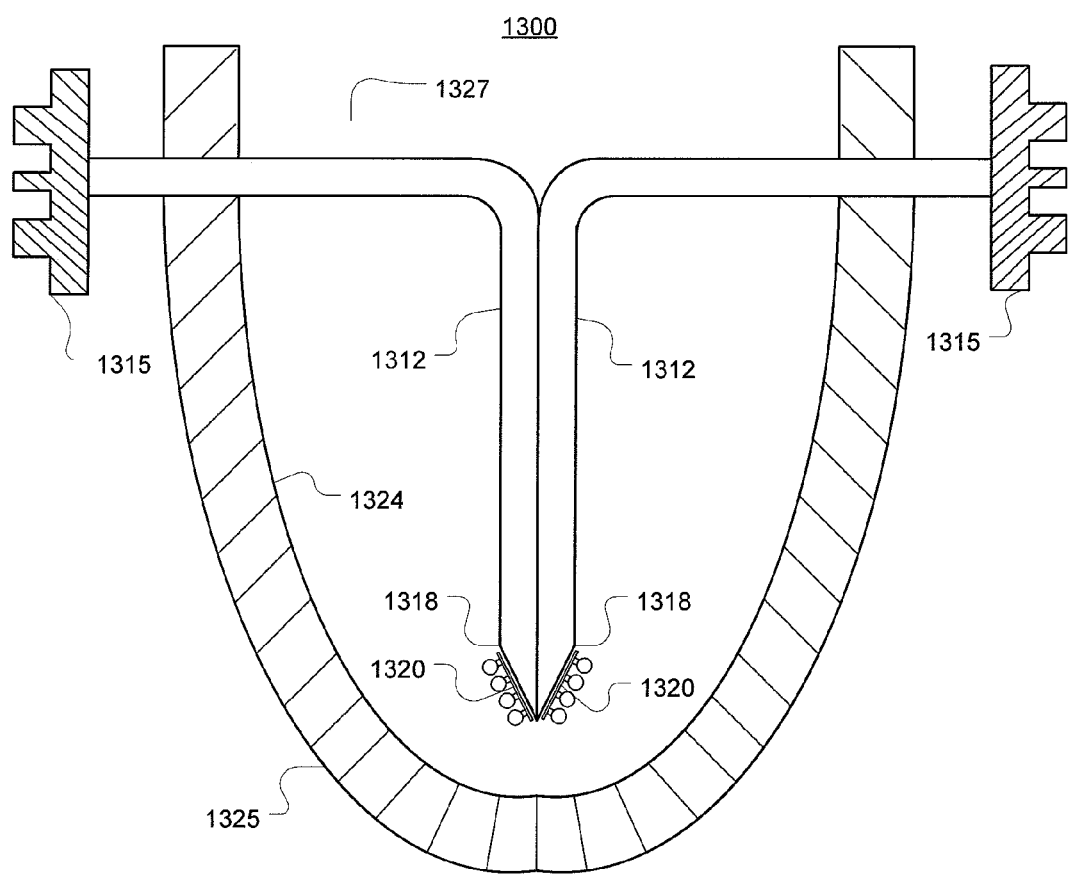
FIG. 13 is a cross sectional view of an illumination module according to one embodiment of the present invention.

FIG. 13 illustrates an illumination module according to one embodiment of the present invention. The illumination module 1300 includes a plurality of light-emitting elements 1320 thermally coupled at the evaporator end 1318 of one or more heat pipes and in particular a first heat pipe portion 1312. The heat pipe includes a second heat pipe portion 1327 that is in thermal communication with heat sinks 1315 and the first heat pipe portion enabling heat dissipation of the light-emitting elements 1320. The illumination module 1300 further includes a housing 1325 which may serve as a heat sink when thermally coupled to heat sinks 1315 or the second heat pipe portion 1327 of the heat pipe. Output light from the light-emitting elements 1320, which may be positioned in the focal plane of an optical reflector 1324, for example a parabolic reflector, disposed on the inner wall of the housing 1325, is reflected thereby towards the exit aperture of the illumination module 1300 in a direction that is substantially collimated along the longitudinal axis of the illumination module 1300. The heat pipe and housing 1325 are constructed such that the second heat pipe portion can be slotted into slots around the rim of the exit plane of the housing. Inside the envelope defined by the illumination module, and for the majority of the length of the illumination module, heat and light from the light-emitting elements both travel in substantially the same direction.

It is understood that the foregoing embodiments of the invention are examples and can be varied in many ways. Such present or future variations are not to be regarded as a departure from the spirit and scope of the invention, and all such modifications as would be readily understood to one skilled in the art are intended to be included within the scope of the following claims.

We claim:

1. An illumination module comprising:
   one or more arrays of light-emitting elements for generating light in a first direction;
   one or more heat extraction elements in thermal communication with at least one of the arrays of the light-emitting elements, the heat extraction elements transferring heat substantially in a second direction, wherein the first direction is substantially opposite the second direction, wherein at least one of the one or more heat extraction elements includes a heat pipe or a thermosyphon;
   an optical reflector system optically positioned below an optical element and coupled to the arrays of the light-emitting elements,
   said optical reflector system retaining said one or more arrays of light-emitting elements in an interior area and configured to redirect the light generated by the array of the light-emitting elements from said first direction to substantially said second direction;
   wherein said illumination module outputs light in substantially said second direction,
   said heat extraction elements including a condenser at a first end and an evaporator at a second end, said condenser near a light output area of said optical element,
   said evaporator and said condenser forming a thermally conductive path for transport of heat away from said light-emitting elements towards said first end primarily in said second direction to a location substantially adjacent said light output area of said optical element;
   said illumination module light-emitting elements having a substrate thermally coupled to said evaporator at said second end.

2. The illumination module according to claim 1, wherein the optical reflector system comprises a light guide.

3. The illumination module according to claim 1, wherein said optical reflector system and said optical element are configured to collimate the light generated by the one or more light emitting elements prior to the light exiting the illumination module.

4. The illumination module according to claim 3, wherein the optical element is further configured to mix the light emitted by the one or more light-emitting elements.

5. The illumination module according to claim 3, wherein the optical element is selected from the group consisting of: a total internally reflecting concentrator, a compound parabolic concentrator, an elliptical concentrator, a compound elliptical concentrator, a totally internally reflecting reflector and a compound hyperbolic concentrator.

6. The illumination module according to claim 3, comprising a plurality of heat extraction elements each having a sidewall portion, wherein the sidewall portions define the optical element configured to collimate the light emitted by the one or more light-emitting elements.

7. The illumination module according to claim 6, wherein the plurality of heat extraction elements are configured with a parabolic shape.

8. The illumination module according to claim 1, wherein the optical system further comprises an optical diffuser.

9. The illumination module according to claim 1, wherein the one or more heat extraction elements are thermally coupled to a heat sink.

10. The illumination module according to claim 1, wherein the one or more heat extraction elements are thermally coupled to an active cooling device.

11. The illumination module according to claim 1, wherein the one or more heat extraction elements comprise circuit traces thereon configured to provide electrical connectivity to the one or more light-emitting elements.

12. The illumination module according to claim 1, wherein the one or more heat extraction elements are electrically passive.

13. The illumination module according to claim 1, wherein the one or more heat extraction elements are electrically conductive and configured to provide electrical connectivity to the one or more light-emitting elements.

14. The illumination module according to claim 1, wherein the one or more light emitting elements are mounted directly on the one or more heat extraction elements.

15. The illumination module according to claim 9, wherein the heat sink has an inner surface, said inner surface configured to collimate the light.

16. The illumination module according to claim 9, wherein the heat sink has an inner surface, said inner surface configured as an optically reflective surface.

17. The illumination module according to claim 1, wherein the second direction is diametrically opposite to the first direction.

18. An illumination module comprising:
a plurality of light-emitting elements to generate light in a first direction within an interior of an optical reflector system;
one or more heat extraction elements in thermal communication with said plurality of light-emitting elements, the heat extraction elements transferring heat substantially in a second direction, wherein the first direction is substantially opposite said second direction and away from an optical element, wherein said extraction elements includes a heat pipe;
said optical reflector system optically positioned below said optical element and coupled to said light-emitting elements and having a light exit into said optical element so that said optical reflector system is optically coupled with said optical element;
said optical reflector system allowing said plurality of light emitting elements to emit light away from a light output area of said optical element;
said optical reflector system retaining said light-emitting elements in said interior area and configured to redirect light generated by said light-emitting elements from said first direction to substantially said second direction through said interior area of said optical reflector system;
wherein said illumination module outputs light in substantially said second direction,
said heat extraction elements including a condenser at a first end and an evaporator at a second end, said condenser near said light output area of said optical element,
said heat extraction elements extending along an exterior of said optical element substantially towards said light output area of said optical element;
said evaporator and said condenser forming a thermally conductive path for transport of heat away from said light-emitting elements towards said first end primarily in said second direction to a location substantially adjacent said light output area of said optical element;
said illumination module light-emitting elements having a substrate thermally coupled to said evaporator at said second end.

* * * * *